(12) United States Patent
Liu et al.

(10) Patent No.: US 11,985,722 B2
(45) Date of Patent: May 14, 2024

(54) METHOD AND APPARATUS FOR FREQUENCY MEASUREMENT AND GAP CONFIGURATION

(71) Applicant: ZTE Corporation, Guangdong (CN)

(72) Inventors: Jing Liu, Shenzhen (CN); Xiaojuan Shi, Shenzhen (CN); He Huang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 369 days.

(21) Appl. No.: 17/342,934

(22) Filed: Jun. 9, 2021

(65) Prior Publication Data

US 2021/0298061 A1    Sep. 23, 2021

Related U.S. Application Data

(63) Continuation of application No. 17/244,322, filed on Apr. 29, 2021, now Pat. No. 11,864,254, which is a
(Continued)

(51) Int. Cl.
*H04W 72/23* (2023.01)
*H04W 24/10* (2009.01)
(Continued)

(52) U.S. Cl.
CPC ........... *H04W 76/16* (2018.02); *H04W 24/10* (2013.01); *H04W 72/0446* (2013.01);
(Continued)

(58) Field of Classification Search
CPC . H04L 27/2601; H04L 5/0053; H04L 5/0094; H04L 5/00; H04L 5/0044; H04L 1/08; H04L 1/1819; H04L 1/1854; H04L 1/189; H04L 1/1896; H04L 5/0007; H04L 5/0051; H04L 5/0055; H04L 5/0091;
(Continued)

(56) References Cited

U.S. PATENT DOCUMENTS 11,297,522 B2* 4/2022 Ma .................... H04W 24/10
11,528,619 B2* 12/2022 Chen ...................... H04L 5/001
(Continued)

FOREIGN PATENT DOCUMENTS

CN    101147415 A    3/2008
CN    103748912 A    4/2014
(Continued)

OTHER PUBLICATIONS

Office Action for corresponding Chinese application No. 202110880890.X dated Jan. 12, 2023, 6p, in Chinese language.
(Continued)

*Primary Examiner* — Nathan S Taylor
(74) *Attorney, Agent, or Firm* — Crowell & Moring LLP

(57) ABSTRACT

A method for configuring a gap includes transmitting, by a first base station, a first message to a user equipment to configure the gap, the first message including first time reference information and the first timing reference information indicating a cell including, a primary cell of the first base station, a primary cell of a second base station, or a serving cell; and configuring, by using the first message, the user equipment to use a system frame number and a subframe of the cell for gap calculation.

18 Claims, 5 Drawing Sheets

Related U.S. Application Data continuation of application No. PCT/CN2018/113382, filed on Nov. 1, 2018.

(51) Int. Cl.
*H04W 72/0446* (2023.01)
*H04W 72/0453* (2023.01)
*H04W 72/1263* (2023.01)
*H04W 72/27* (2023.01)
*H04W 76/15* (2018.01)
*H04W 76/16* (2018.01)
*H04W 76/27* (2018.01)

(52) U.S. Cl.
CPC ... *H04W 72/0453* (2013.01); *H04W 72/1263* (2013.01); *H04W 72/23* (2023.01); *H04W 72/27* (2023.01); *H04W 76/15* (2018.02); *H04W 76/27* (2018.02)

(58) Field of Classification Search
CPC ......... H04L 5/0096; H04L 5/10; H04L 41/06; H04L 1/18; H04L 1/1812; H04L 1/1867; H04W 28/0268; H04W 28/10; H04W 76/10; H04W 80/02; H04W 76/12; H04W 28/02; H04W 80/10; H04W 76/20; H04W 52/0235; H04W 74/0833; H04W 76/27; H04W 76/28; H04W 72/21; H04W 72/23; H04W 4/70; H04W 52/02; H04W 72/04; H04W 74/04; H04W 74/08; H04W 76/00; H04W 72/12; H04W 76/30; H04W 56/0045; H04W 56/0055; H04W 74/006; H04W 74/0891; H04W 76/19; H04W 76/38; H04W 24/08; H04W 36/0055; H04W 36/08; H04W 36/14; H04W 52/0209; H04W 68/005; H04W 68/02; H04W 72/0446; H04W 72/51; H04W 74/02; H04W 76/36; H04W 8/24; H04W 56/0005; H04W 72/046; H04W 72/1268; H04W 74/002; H04W 76/32; H04W 52/0229; H04W 52/028; H04W 52/325; H04W 52/36; H04W 52/50; H04W 56/00; H04W 68/00; H04W 4/00; H04W 74/00; H04W 52/32; Y02D 30/70; H04B 1/713; H04B 1/7143; H04J 13/0062; H04J 13/00
See application file for complete search history.

(56) References Cited

U.S. PATENT DOCUMENTS

| | | | |
|---|---|---|---|
| 2008/0220766 A1 | 9/2008 | Bertho et al. | |
| 2013/0016690 A1* | 1/2013 | Jeong | H04W 24/10 370/329 |
| 2013/0182583 A1* | 7/2013 | Siomina | H04W 24/00 370/252 |
| 2014/0051426 A1* | 2/2014 | Siomina | H04W 48/16 455/422.1 |
| 2015/0036518 A1 | 2/2015 | Shi et al. | |
| 2015/0312805 A1* | 10/2015 | Cui | H04W 36/0061 370/331 |
| 2015/0341815 A1* | 11/2015 | Kim | H04W 72/0453 370/252 |
| 2016/0044516 A1 | 2/2016 | Hedayat et al. | |
| 2016/0056939 A1* | 2/2016 | Kim | H04W 24/10 370/331 |
| 2017/0230815 A1* | 8/2017 | Yasukawa | H04W 52/02 |
| 2017/0339595 A1* | 11/2017 | Siomina | H04W 4/023 |
| 2018/0091173 A1* | 3/2018 | Axmon | H03M 13/6306 |
| 2018/0132258 A1* | 5/2018 | Andou | H04L 5/0082 |
| 2018/0241416 A1* | 8/2018 | Axmon | H03M 13/41 |
| 2018/0302818 A1 | 10/2018 | Wu | |
| 2018/0359790 A1* | 12/2018 | Ingale | H04W 74/08 |
| 2019/0394666 A1* | 12/2019 | Li | H04B 7/0417 |
| 2020/0128453 A1* | 4/2020 | Teyeb | H04W 36/0072 |
| 2020/0169956 A1* | 5/2020 | Sun | H04W 24/08 |
| 2020/0178129 A1* | 6/2020 | Siomina | H04W 24/10 |
| 2020/0314946 A1* | 10/2020 | Tsuboi | H04W 24/10 |
| 2021/0211899 A1* | 7/2021 | Koziol | H04W 24/10 |
| 2021/0227413 A1* | 7/2021 | Yang | H04W 56/0045 |

FOREIGN PATENT DOCUMENTS

| | | | | |
|---|---|---|---|---|
| CN | 105191389 A | 12/2015 | | |
| CN | 108141749 A | 6/2018 | | |
| EP | 3337256 A1 * | 6/2018 | ............. | H04W 4/70 |
| EP | 3 525 511 A1 | 8/2019 | | |
| EP | 3823220 A1 * | 5/2021 | ......... | H04B 7/15507 |
| WO | WO 2014/074919 A1 | 5/2014 | | |
| WO | WO 2015/027402 A1 | 3/2015 | | |
| WO | WO 2018/185640 A1 | 10/2018 | | |
| WO | WO 2018/093132 A1 | 5/2019 | | |

OTHER PUBLICATIONS

English language translation of the First Office Action for corresponding Chinese application No. 202110880890.X dated Jan. 12, 2023, 2p.
Extended European Search Report for European application No. 21217093.0 dated Jun. 1, 2022, 11p.
ZTE Corporation et al., "Measurement and gap configuration framework in NE-DC", 3GPP TSG-RAN WG2 Meeting #103, R2-1811745, Aug. 24, 2018, 5p, Sweden.
ZTE Corporation et al., "Measurement and gap configuration framework in NGEN-DC", 3GPP TSG-RAN WG2 Meeting #103, R2-1811743, Aug. 24, 2018, 4p, Sweden.
ZTE Corporation et al., "Consideration on the measurement configuration for NR-NR DC", 3GPP TSG-RAN WG2 Meeting #103, R2-1811589, Aug. 24, 2018, 7p, Sweden.
ZTE Corporation et al., "$3^{rd}$ Generation Partnership Project; Technical Specification Group Radio Access Network; NR; Radio Resource Control (RRC) protocol specification (Release 15)", 3GPP TW 38.331, v15.3.0, Sep. 2018, 445p, France.
Extended European Search Report for European application No. 19921834.8 dated Jun. 1, 2022, 10p.
NTT Docomo, Inc., "Clarification on maxMeasFreqsSCG in CG-ConfigInfo", Change Request, 3GPP TSG-RAN2 Meeting #102, R2-1808355, May 25, 2018, 5p, Korea.
Nokia et al., "Consideration on Measurement configuration in NG-EN DC", 3GPP TSG-RAN WG2 Meeting #103bis, R2-1814507 (revision of R2-1812712), Oct. 12, 2018, 3p, China.
Huawei et al., "CR on 38.331 for inter-node message in NN-DC", Change Request, 3GPP TSG-RAN WG2 Meeting #103bis, R2-1815405, Oct. 12, 2018, 6p, China.
ZTE Corporation et al., "Corrections on MaxMeasIdentititesSCG-NR in MR-DC", Change Request, 3GPP TSG-RAN2 Meeting #107 bis, R2-1912766, Oct. 18, 2019, 15p, China.
Huawei et al, "CR on 38.331 for inter-node message in NN-DC; $3^{rd}$ Generation Partnership Project (3GPP), Mobile Competence Centre", R2-1815618, Oct. 12, 2018, 6p, China.
Search Report for corresponding Chinese application No. 20211119048.2 dated Apr. 23, 2023, 3p, in Chinese language.
Substantive Examination Result for corresponding Indonesian application No. P00202103996 dated May 19, 2023, 5p, with English Translation.
Concise Explanation.
Extended European Search Report for European application No. 18930063.5 dated Jun. 1, 2022, 6p.
Second Office Action issued for corresponding application No. CN 202110880890.X dated Jul. 15, 2023, 8p, in Chinese language.
English language translation for the Second Office Action for corresponding application No. CN 202110880890.X dated Jul. 15, 2023, 4p.

(56) References Cited

OTHER PUBLICATIONS

International Search Report and Written Opinion for priority application No. PCT/CN2018/113382, dated Aug. 8, 2019, 8p.

\* cited by examiner

METHOD AND APPARATUS FOR FREQUENCY MEASUREMENT AND GAP CONFIGURATION

RELATED APPLICATIONS

This application is a continuation of U.S. application Ser. No. 17/244,322, entitled "METHOD AND APPARATUS FOR FREQUENCY MEASUREMENT AND GAP CONFIGURATION" and filed on Apr. 29, 2021, which is a continuation of PCT Application No. PCT/CN2018/113382, entitled "METHOD AND APPARATUS FOR FREQUENCY MEASUREMENT AND GAP CONFIGURATION" and filed to the National Intellectual Property Administration, PRC on Nov. 1, 2018. The above applications are hereby incorporated by reference in their entireties.

TECHNICAL FIELD

This disclosure relates generally to wireless communications and, more particularly, to a method and apparatus for configuring frequency measurement and determining a time reference for gap calculation in New Radio with dual connectivity.

BACKGROUND

With a continuous increasing of global smartphone users, mobile data usage and traffic will continue to grow. In New Radio, dual connectivity (DC) are proposed to allow a wireless communication device with multiple transceivers to simultaneously receive data packet from at least two wireless communication nodes, for example a Master gNodeB (MgNB) and a secondary gNodeB (SgNB). In New Radio, a wireless communication device can perform measurement on intra-frequency, inter-frequency and inter-RAT (Radio Access Technology) frequencies. This frequency measurement by the wireless communication device is configured by a Master gNodeB and/or a Secondary gNodeB in order to facilitate mobility management or other radio resource management functions.

SUMMARY

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In LTE dual connectivity (DC), a wireless communication device (UE) may have multiple serving cells belong to different wireless communication nodes (eNBs) which are known as primary eNB (MeNB) and secondary eNB (SeNB), and the primary cell in MeNB is named as PCell and the primary cell in SeNB is named as PSCell. In LTE specification, only MeNB can configure and manage frequency measurements for the UE. When a measured frequency by the UE and a serving cell belong to a same RAT (e.g. LTE), wherein the measured frequency has the same center frequency as a frequency of one of the UE's serving cells from both the MeNB and the SeNB, the frequency is known as "intra-frequency" and a frequency measurement task performed by the UE is an "intra-frequency measurement". Accordingly, an index of the intra-frequency measurement task is used as an inter-frequency measurement identity. Similarly, when the measured frequency has different center frequency from any one of the UE's serving cells, the frequency is known as "inter-frequency" and the frequency measurement task is an "inter-frequency measurement". Similarly, an index of the inter-frequency measurement task is used as an inter-frequency measurement identity. When the frequency belongs to a different RAT, it is called "inter-RAT measurement". Since only MeNB can conduct measurements configuration, it is simple for MeNB to ensure a maximum number of measured frequency layers and a maximum number of frequency measurement identities are within the capability of the UE, e.g., a maximum number of frequency layers that can be measured by the UE or a maximum number of frequency measurement identities.

In new radio (NR) system, a similar DC architecture can be also introduced. In NR-DC, a UE can connect to multiple NR nodes (gNodeB or gNB) including at least one master gNB (MgNB) and at least one secondary gNB (SgNB). Serving cells within one of the at least one MgNB are grouped together to form a Master Cell Group (MCG), and serving cells within one of the at least one SgNB are grouped together to form a Secondary Cell Group (SCG). Different from LTE, each of the at least one SgNB in NR-DC is allowed to configure frequency measurement and transmits a configuration of a frequency measurement directly to the UE. For example, when a signal radio bearer over a SgNB and a UE is already established, the configuration of the frequency measurement can be transmitted to the UE via the signal radio bearer directly. For another example, when a signal radio bearer is not established, a configuration of the frequency measurement can be delivered directly from a respective MgNB to the UE. The frequency measurements configured by the at least one SgNB and the at least one MgNB to the UE are required to be coordinated to ensure the configuration (e.g., total number of configured frequency measurement identities) is within the capability of the UE.

Furthermore, in NR DC, an MgNB is also responsible for configuring all types of gap patterns. However, the UE may acquire different synchronization timing from different serving cells of different gNodeBs, a gap calculation in the time domain based on just the gap pattern received from the MgNB is ambiguous and extra interruption of data scheduling is required. Therefore, there exists a need to develop a method and apparatus for accurately configuring frequency measurement and reference timing for gap calculation in New Radio with dual connectivity.

In one embodiment, a method for configuring a frequency measurement by a first wireless communication node, includes: transmitting a first message to a second wireless communication node, wherein the first message comprises at least one of the following: a first maximum number of allowed intra-frequency measurement identities and a first maximum number of allowed inter-frequency measurement identities, and wherein the first message is used by the by the second wireless communication node to determine a first configuration of the frequency measurement for a wireless communication device.

In a further embodiment, a method for configuring a frequency measurement by a first wireless communication node, includes: receiving a first message from a second wireless communication node, and determining a first configuration of the frequency measurement for a wireless communication device according to the first message, wherein the first message comprises at least one of the following: a first maximum number of allowed intra-frequency measurement identities and a first maximum number of allowed inter-frequency measurement identities.

In a further embodiment, a method for determining a type of a frequency measurement by a first wireless communication node, includes: transmitting a first message to a second wireless communication node, wherein the first message comprises frequency information of all first serving cells of the first wireless communication node, and wherein the frequency information of all first serving cells of the first wireless communication node is used by the second wireless communication node together with frequency information of all second serving cells of the second wireless communication node to determine the type of the frequency measurement.

In a further embodiment, method for determining a type of a frequency measurement by a first wireless communication node, includes: receiving a first message from a second wireless communication node, wherein the first message comprises frequency information of all first serving cells of the second wireless communication node; and determining the type of the frequency measurement according to at least one of the following: the frequency information of all the first serving cells of the second wireless communication node in the first message and frequency information of all second serving cells of the first wireless communication node.

In a further embodiment, a method for configuring a gap, includes transmitting, by a first base station, a first message to a user equipment to configure the gap, the first message including first time reference information and the first timing reference information indicating a cell including, a primary cell of the first base station, a primary cell of a second base station, or a serving cell; and configuring, by using the first message, the user equipment to use a system frame number and a subframe of the cell for gap calculation.

In a further embodiment, a wireless communication node includes a transceiver, configured to transmit a first message to a user equipment to configure a gap, the first message including first time reference information and the first timing reference information indicating a cell including a primary cell of a first base station, a primary cell of a second base station, or a serving cell, wherein the first message is adapted to configure the user equipment to use a system frame number and a subframe of the cell for gap calculation.

In a further embodiment, a method for configuring a gap includes receiving, by a user equipment, a first message from a first base station, the first message including time reference information and the timing reference information indicating a cell including a primary cell of the first base station, a primary cell of a second base station, or a serving cell; and determining to use a system frame number and a subframe of the cell for gap calculation according to the timing reference information.

In a further embodiment, a wireless communication device includes a transceiver, configured to receive a first message from a first base station, the first message including time reference information and the timing reference information indicating a cell including a primary cell of the first base station, a primary cell of a second base station, or a serving cell; and a processor, electrically coupled to the transceiver and configured to determine to use a system frame number and a subframe of the cell for gap calculation according to the timing reference information.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
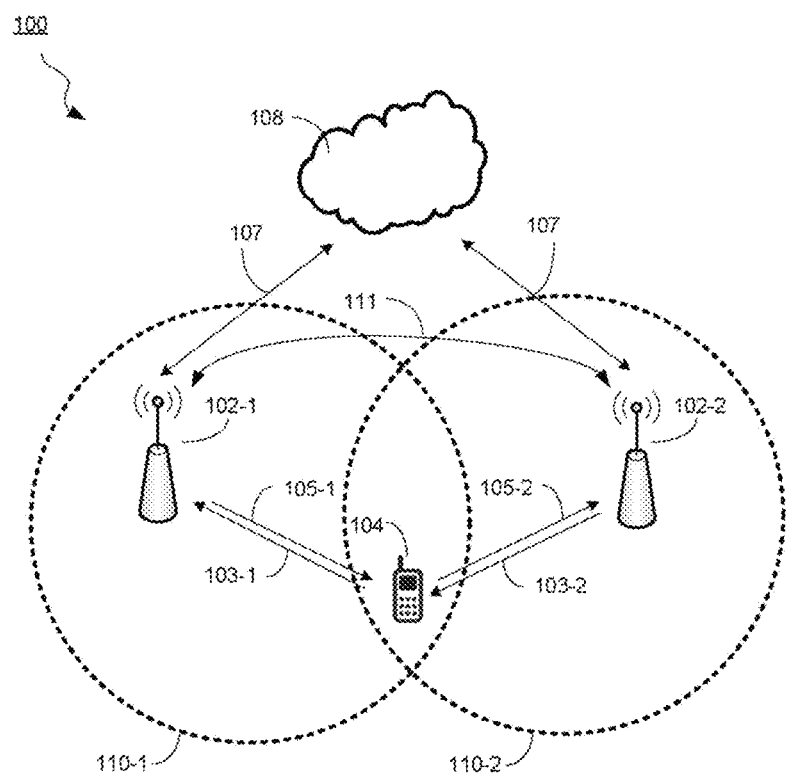
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) 102 can be a node B, an E-UTRA Node B (also known as Evolved Node B, eNodeB or eNB), a gNodeB (also known as gNB) in new radio (NR) technology, a pico station, a femto station, or the like. A terminal side communication device or a user equipment (UE) 104 can be a long range communication system like a mobile phone, a smart phone, a personal digital assistant (PDA), tablet, laptop computer, or a short range communication system such as, for example a wearable device, a vehicle with a vehicular communication system and the like. A network communication node and a terminal side communication device are represented by a BS 102 and a UE 104, respectively, and in all the embodiments in this disclosure hereafter, and are generally referred to as "communication nodes" and "communication device" herein. Such communication nodes and communication devices may be capable of wireless and/or wired communications, in accordance with various embodiments of the invention. It is noted that all the embodiments are merely preferred examples, and are not intended to limit the present disclosure. Accordingly, it is understood that the system may include any desired combination of BSs 102 and UEs 104, while remaining within the scope of the present disclosure.

Referring to FIG. 1A, the wireless communication network 100 includes a first BS 102-1, a second BS 102-2, and a UE 104. In some embodiments, the UE 104 forms direct communication (i.e., uplink) channels 103-1 and 103-2 with the first BS 102-1 and the second BS 102-2, respectively. In some embodiments, the UE 104 also forms direct communication (i.e., downlink) channels 105-1 and 105-2 with the first BS 102-1 and the second BS 102-2, respectively. The direct communication channels between the UE 104 and the BS 102 can be through interfaces such as an Uu interface, which is also known as E-UTRA air interface. In some embodiments, the UE 104 comprises a plurality of transceivers which enables the UE 104 to support dual connectivity so as to receive data simultaneously from the first BS 102-1 and the second BS 102-2. The first and second BS 102-1 and 102-2 each is connected to a core network (CN) 108 through an external interface 107, e.g., an Iu interface, or an NG interface. In some other embodiment, the first BS 102-1 (gNB) is a Master Node (MN), which is connected to the CN 108 and the second BS 102-2 (gNB) is a Secondary Node (SN), which is also connected to the CN 108.

In some other embodiments, when the first BS 102-1 and the second BS 102-2 each is a gNB, the direct communication between the first BS 102-1 and the second BS 102-2 is through an Xn interface. The first BS 102-1 and the second BS 102-2 are neighboring B Ss. A first serving cell 110-1 is covered by the first BS 102-1 and the second serving cell 110-2 is covered by the second BS 102-2. In some embodiments, the first cell 110-1 is a primary cell of the MN, known as PCell, and the second cell 110-2 is a primary cell of the SN, known as PSCell. In some embodiments, the first cell 110-1 and the second cell 110-2 are neighboring cells.

Figure 1B:
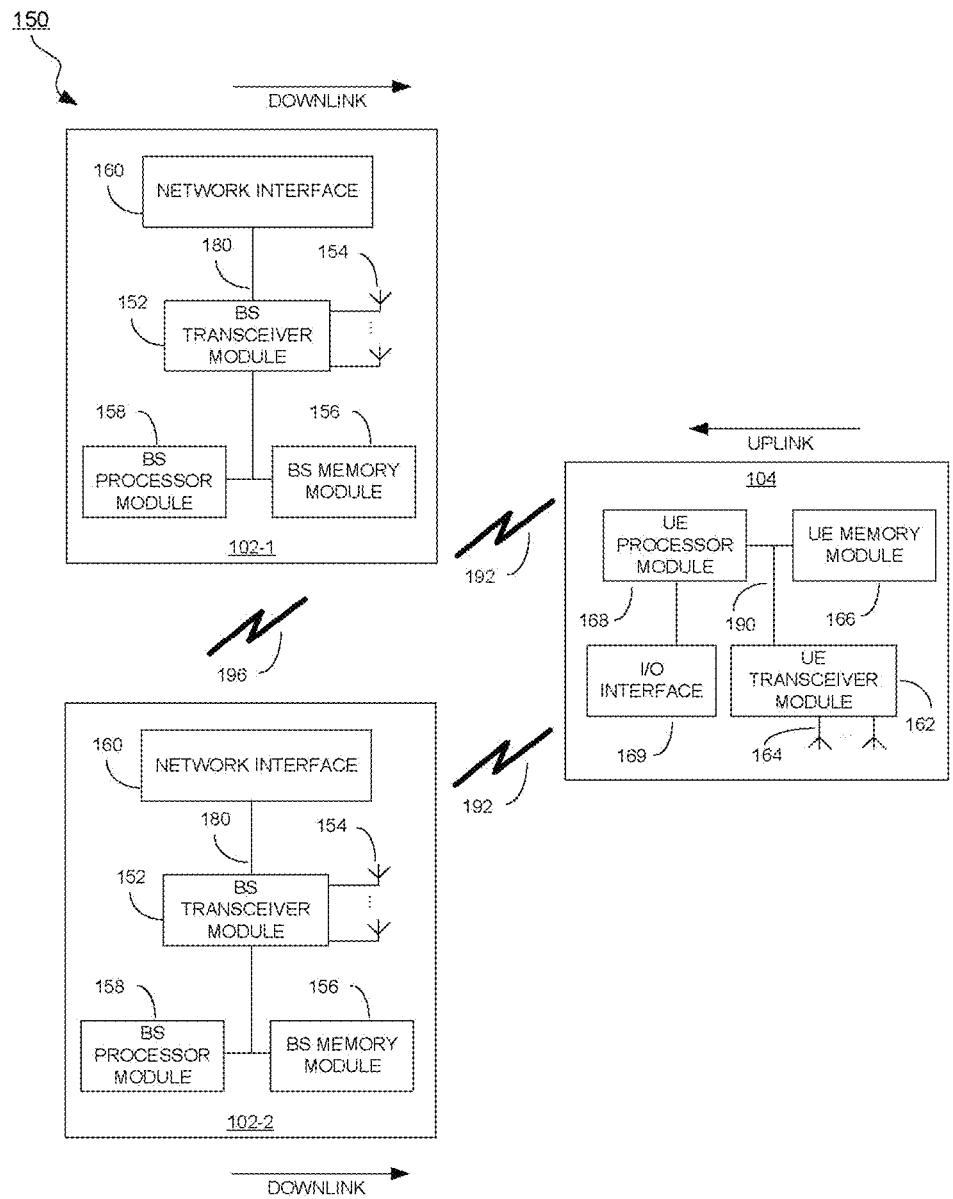
FIG. 1B illustrates a block diagram of an exemplary wireless communication system, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a first BS 102-1, a second 102-2, and a UE 104, collectively referred to as BS 102 and UE 104 below for ease of discussion. The first BS 102-1 and the second BS 102-2 each comprises a BS transceiver module 152, a BS antenna array 154, a BS memory module 156, a BS processor module 158, and a network interface 160. In the illustrated embodiment, each module of the BS 102 are coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 are coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192. The BS transceiver 152 communications through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between B Ss.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Referring again to FIG. 1A, as mentioned above, the BS 102 repeatedly broadcasts system information associated with the BS 102 to one or more UEs 104 so as to allow the UEs 104 to access the network within the cells (e.g., 110-1 for the first BS 102-1 and 110-2 for the second BS 102-2) where the BS 102 is located, and in general, to operate properly within the cell. Plural information such as, for example, downlink and uplink cell bandwidths, downlink and uplink configuration, cell information, configuration for random access, etc., can be included in the system information, which will be discussed in further detail below. Typically, the BS 102 broadcasts a first signal carrying some major system information, for example, configuration of the cell 110 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
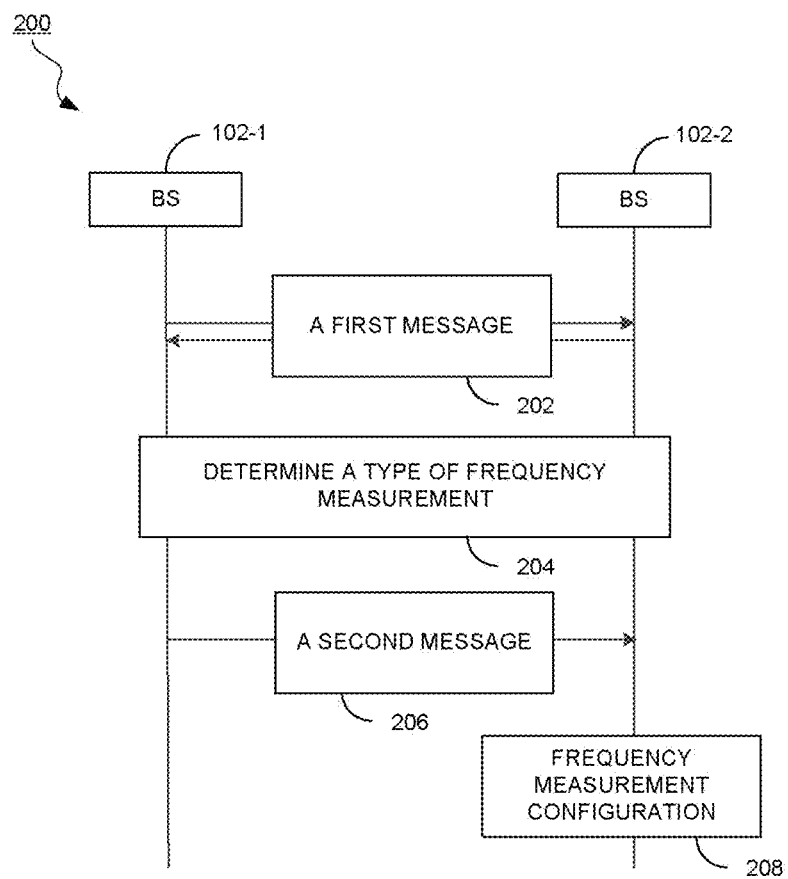
FIG. 2 illustrates a method for configuring a frequency measurement, in accordance with some embodiments of the present disclosure.

FIG. 2 illustrates a method 200 for configuring a frequency measurement, in accordance with some embodiments of the present disclosure. It is understood that additional operations may be provided before, during, and after the method 200 of FIG. 2, and that some operations may be omitted or reordered. The communication system in the illustrated embodiment comprises a first BS 102-1, and a second BS 102-2. In the illustrated embodiments, a UE 104 (not shown) is in one of at least one serving cell covered by the first BS 102-1 and also in one of at least one serving cell covered by the second BS 102-2, i.e., the UE 104 is in connection with the first BS 102-1 and the second BS 102-2. In some embodiments, the first BS 102-1 is a primary wireless communication node and the second BS 102-2 is a secondary wireless communication node. In some other embodiments, the second BS 102-2 is a primary wireless communication node and the first BS 102-1 is a secondary wireless communication node. It should be noted that any numbers of BS 102 can be used and are within the scope of this invention.

The method 200 starts with operation 202 in which the first BS 102-1 transmits a first message to the second BS 102-2 according to some embodiments. In some embodiments, the first message comprises frequency information of all serving cells of the first BS 102-1. In some embodiments, the first message is transmitted from the first BS 102-1 to the second BS 102-2 through a UE-specific inter-node RRC (Radio Resource Control) message (e.g., CG-ConfigInfo). In some embodiments, the first message is transmitted during an addition or a modification process to the second BS 102-2. In some embodiments, the frequency information of all the serving cells of the first BS 102-1 comprises at least one of the following: frequency information of synchronization signal blocks (SSB) of the respective serving cells, and frequency information of channel state information reference signals (CSI-RS) of the respective serving cells. In some embodiments, the frequency information of the SSBs of the respective serving cells comprises at least one of the following of a SSB: a center frequency, a subcarrier spacing, and a band indicator. In some embodiments, the frequency information of CSI-RSs of the respective serving cells comprises at least one of the following of a CSI-RS: a start position in the frequency domain, a frequency offset, and a frequency bandwidth.

For example, the first BS 102-1 comprises a first serving cell with a first center frequency and a second serving cell with a second center frequency. The second BS 102-2 comprises a third serving cell with a third center frequency and a fourth serving cell with a fourth center frequency. During an addition or a modification process to the second BS 102-2, the first BS 102-1 transmits a first message to the second BS 102-2 so as to indicate frequency information (e.g., the first center frequency and the second center frequency) of the first serving cell and the second serving cell, respectively, to the second BS 102-2 through an inter-node RRC message (e.g., CG-ConfigInfo).

For another example, the first BS 102-1 comprises a first serving cell with a first SSB with a first center frequency. The first BS 102-1 also comprises a second serving cell with a CSI-RS with a first starting frequency and a first bandwidth. The second BS 102-2 comprises a second serving cell with a second SSB with a second center frequency. During an addition or a modification process to the second BS 102-2, the first BS 102-1 transmits a first message to the second BS 102-2 so as to indicate frequency information (e.g., the first center frequency, the first starting frequency, and the first bandwidth) of the first serving cell and the second serving cell, respectively, to the second BS 102-2 through an inter-node RRC message (e.g., CG-ConfigInfo).

In some embodiments, the first message can be received by the first BS 102-1 from the second BS 102-2. In some embodiments, the first message comprises frequency information of serving cells of the second BS 102-2. In some embodiments, the first message received from the second BS 102-2 by the first BS 102-1 is through an inter-node RRC message (e.g., CG-Config).

The method 200 continues with operation 204 in which the second BS 102-2 determines the type of frequency measurement according to some embodiments. In some embodiments, the second BS 102-2 determine the type of frequency measurement by comparing frequency information (e.g., a frequency set) of all serving cells and a measurement frequency.

For example, when the second BS 102-2 receives the frequency information (e.g., the first center frequency and the second center frequency) from the first BS 102-1, the frequency information of all the serving cells of the UE 104 is available to the second BS 102-2. When the second BS 102-2 configures a SSB-based frequency measurement on the first center frequency for the UE 104 which is a subset of the frequency set including the first center frequency, the second center frequency, the third center frequency and the fourth center frequency, and subcarrier spacing of measured SSB is also the same, the type of frequency measurement performed by the UE 104 is an intra-frequency measurement. When the second BS 102-2 configures a SSB-based frequency measurement on a fifth center frequency which is not a subset of the frequency set or with different SSB subcarrier spacing, the type of frequency measurement performed by the UE 104 is an inter-frequency measurement.

For another example, when the second BS 102-2 receives the CSI-RS frequency information (e.g., the first starting frequency, the first offset frequency and the first bandwidth) of the first serving cell and the SSB frequency information (e.g. the second center frequency and second subcarrier spacing) of the second serving cell of the first BS 102-1, the frequency information of all the serving cells of the UE 104 from both the first BS 102-1 and the second BS 102-2 is available to the second BS 102-2. When the second BS 102-2 configures a SSB-based frequency measurement on the third center frequency, the type of frequency measurement performed by the UE 104 is an inter-frequency measurement. When the second BS 102-2 configures a CSI-RS-based frequency measurement at the first starting frequency, first offset frequency with the first bandwidth, the type of frequency measurement performed by the UE 104 is an inter-frequency measurement.

In some embodiments, when the first message is received by the first BS 102-1, the first BS 102-1 can also determine the type of frequency measurement by comparing the frequency information of all the serving cells from both the first BS 102-1 and the second BS 102-2 and the measurement frequency configured by the first BS 102-1 for the UE 104.

The method 200 continues with operation 206 in which the first BS 102-1 transmits a second message to the second BS 102-2 according to some embodiments. In some embodiments, the second message is transmitted from the first BS 102-1 to the second BS 102-2 through a UE-specific inter-node RRC message. In some embodiments, the second message comprises a frequency measurement configuration. In some embodiments, the second message transmitted from the first BS 102-1 comprises at least one restriction of the frequency measurement configured by the second BS 102-2 for the UE 104. In some embodiments, the at least one restriction transmitted from the first BS 102-1 to the second BS 102-2 comprises one of the following: a maximum number of allowed intra-frequency measurement identities and a maximum number of allowed inter-frequency measurement identities that can be configured by the second BS 102-2 to the UE 104.

In some embodiments, the maximum number of allowed intra-frequency measurement identities comprises an integer, which can be used for configuring each serving frequencies of the respective serving cells. In some embodiments, the maximum number of allowed intra-frequency measurement identities comprises a plurality of integers for configuring a plurality of respective serving frequencies of respective serving cells. In some embodiments, the plurality of integers of the plurality of respective serving frequencies may be different. In some embodiments, the serving frequencies of the corresponding integers are also specified in the second message.

In some embodiments, when the maximum number of allowed intra-frequency measurement identities of a respective frequency in the second message from the first BS 102-1 is "0", the second BS 102-2 is not allowed to configure the maximum number of allowed intra-frequency measurement on the respective frequency for the UE 104. In some embodiments, when a maximum number of allowed intra-frequency measurement identities of a respective frequency is not specified in the first message, the second BS 102-2 can configure a maximum number of intra-frequency measurement identities by itself which is not restricted by the first BS 102-1. In some embodiments, the maximum number of allowed intra-frequency measurement identities configured by the second BS 102-2 is equal to or less than a predefined value. In some embodiments, the predefined value is preconfigured in the specifications or configured by the system.

For example, the first BS 102-1 is a master gNB (MgNB), which has a first serving cell operating on a first frequency, and a second serving cell operating on a second frequency. The second BS 102-2 is a secondary gNB (SgNB), which has a third serving cell operating on a third frequency and a fourth serving cell operating on a fourth frequency. During a secondary node addition or modification procedure, the first BS 102-1 transmits a second message to the second BS 102-2 through an inter-node RRC message (e.g., CG-ConfigInfo). In one embodiments, the first message comprises a maximum number (e.g., $X=5$) of allowed intra-frequency measurement identities for the serving frequencies including the first frequency, the second frequency, the third frequency and the fourth frequency. In some embodiments, the first message comprises a list of maximum numbers of allowed intra-frequency measurement identities $X=[X1, X2, X3, X4]=[3, 2, 4, 5]$, which corresponds to the first frequency, the second frequency, the third frequency and the fourth frequency. Specifically, the maximum number of allowed intra-frequency measurement identities that can be configured by BS 102-2 for the first NR frequency is 3; the maximum number of allowed intra-frequency measurement identities that can be configured by BS 102-2 for the second NR frequency is 2; the maximum number of allowed intra-frequency measurement identities that can be configured by BS 102-2 for the third NR frequency is 4; and the maximum number of allowed intra-frequency measurement identities that can be configured by BS 102-2 for the fourth NR frequency is 5. In some embodiments, the list of maximum number of allowed intra-frequency measurement identities $X=[X1, X2, X4]=[3, 0, 5]$ corresponding to the first frequency, the second frequency and the fourth frequency. In some embodiments, the maximum number of allowed intra-frequency measurement identities that can be configured by BS 102-2 for the third frequency is not specified by the first BS 102-1 in the second message.

In some embodiments, the second message comprises a maximum number of allowed inter-frequency measurement identities that can be configured by BS 102-2. In some embodiments, the maximum number of allowed inter-frequency measurement identities that can be configured by BS 102-2 comprises an integer for all the inter-frequencies. In some embodiments, if the integer in the second message is "0", the second BS 102-2 is not allowed to configure the maximum number of allowed inter-frequency measurement that can be configured by BS 102-2 for the UE 104. In some embodiments, when an integer in the second message is not specified for a serving frequency, the second BS 102-2 can configure a maximum number of allowed inter-frequency measurement identities for the serving frequency by itself without restrictions from the first BS 102-1. In some embodiments, the total maximum numbers of allowed inter-frequency measurement identities for at least one frequencies configured by the second BS 102-2 is equal to or less than a predefined value. In some embodiments, the predefined value is preconfigured in the specifications or configured by the system.

For example, the first BS 102-1 is a primary wireless communication node, which has a first serving cell operating on a first frequency, and a second serving cell operating on a second frequency. The second BS 102-2 is a secondary wireless communication node, which has a third serving cell operating on a third frequency and a fourth serving cell operating on a fourth frequency. During a secondary node addition or modification procedure, the first BS 102-1 transmits a second message to the second BS 102-2 through an inter-node RRC message (e.g., CG-ConfigInfo). The second message comprises a maximum number (e.g., $Y=6$) of allowed inter-frequency measurement identities for frequency other than the first frequency, the second frequency, the third frequency and the fourth frequency. When the second BS 102-2 configures a maximum number of allowed inter-frequency measurement identities for a fifth frequency and a sixth frequency, which are not a subset of the serving frequencies of serving cells, the summation of the maximum numbers of allowed inter-frequency measurement identities can be configured by BS 102-2 for the fifth frequency and the sixth frequency is equal to or less than $Y=6$.

The method 200 continues with operation 208 in which the second BS 102-2 determines a frequency measurement configuration according to some embodiments. In some embodiments, the type of a frequency measurement is determined after receiving the first message from the first BS 102-1. In some embodiments, the configuration of the frequency measurement is determined by the second BS 102-2 according to the at least one restriction received in the second message from the first BS 102-1. In some embodiments, the configuration of the frequency measurement comprises one of the following: a number of intra-frequency measurement identities or a number of inter-frequency measurement identities that can be configured by BS 102-2 according to some embodiments. In some embodiments, the number of intra-frequency measurement identities and the number of inter-frequency measurement identities each is equal to or less than the maximum number of allowed intra-frequency measurement identities and the maximum number of allowed inter-frequency measurement identities that can be configured by BS 102-2 received in the second message, respectively.

For example, when a maximum number (e.g., $X=5$) of allowed intra-frequency measurement identities that can be configured by BS 102-2 is transmitted to the second BS 102-2 from the first BS 102-1, the second BS 102-2 further configures a number of frequency measurement identities for each serving frequency of the UE 104 according to the maximum number. Specifically, a first number of intra-frequency measurement identities for the first frequency is equal to or smaller than X; a second number of intra-frequency measurement identities for the second frequency is equal to or smaller than X; a third number of intra-frequency measurement identities for the third frequency is equal to or smaller than X; and a fourth number of intra-frequency measurement identities for the fourth frequency is equal to or smaller than X.

For another example, when a maximum number (X=[X1, X2, X3, X4]=[3, 2, 4, 5]) of allowed intra-frequency measurement identities that can be configured by BS 102-2 for corresponding serving frequencies is transmitted to the second BS 102-2 from the first BS 102-1, the second BS 102-2 configures frequency measurements for the UE 104. Specifically, a first number of intra-frequency measurement identities for the first frequency is equal to or smaller than X1=3; a second number of intra-frequency measurement identities for the second frequency is equal to or smaller than X2=2; a third number of intra-frequency measurement identities for the third frequency is equal to or smaller than X3=4; and a fourth number of intra-frequency measurement identities for the fourth frequency is equal to or smaller than X4=5.

For another example, when a maximum number (e.g., X=[X1, X2, X4]=[3, 0, 5]) of allowed intra-frequency measurement identities that can be configured by BS 102-2 for the corresponding serving frequencies is transmitted to the second BS 102-2 from the first BS 102-1, the second BS 102-2 configures frequency measurement for the UE 104. Specifically, a first number of intra-frequency measurement identities for the first frequency is equal to or smaller than X1=3; and a fourth number of intra-frequency measurement identities for the fourth frequency is equal to or smaller than X4=5. Further, since X2=0, the second BS 102-2 is not allowed to configure a second number of intra-frequency measurement identities for the second frequency; and since X3 is not specified in the second message, the second BS 102-2 can configure a third number of intra-frequency measurement identities for the third frequency by itself without restrictions from the first BS 102-1, which is equal to or less than a predefined number.

For another example, when a maximum number (e.g., Y=6) of allowed inter-frequency measurement identities is transmitted to the second BS 102-2 from the first BS 102-1, the second BS 102-2 configures frequency measurement for the UE 104. Specifically, a number of inter-frequency measurement identities for the each of all inter-frequencies is equal to or smaller than Y.

Figure 3:
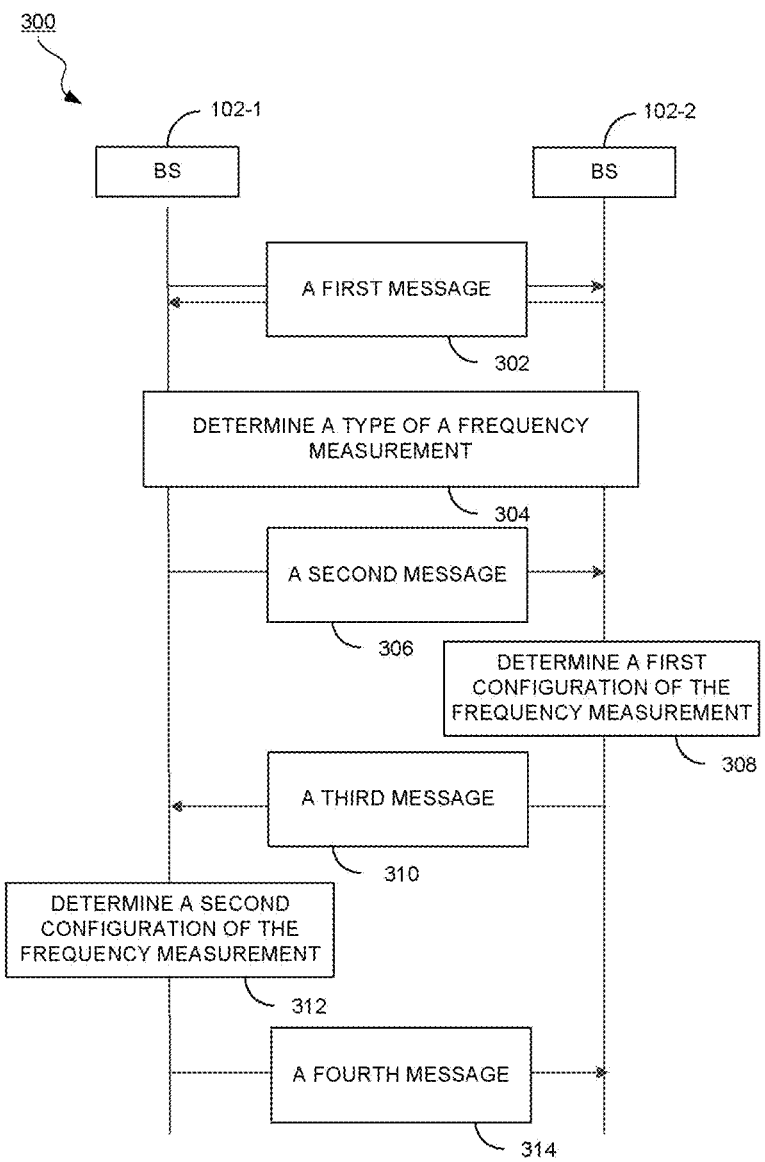
FIG. 3 illustrates a method for configuring a frequency measurement, in accordance with some embodiments of the present disclosure.

FIG. 3 illustrates a method 300 for configuring a frequency measurement, in accordance with some embodiments of the present disclosure. It is understood that additional operations may be provided before, during, and after the method 300 of FIG. 3, and that some operations may be omitted or reordered. The communication system in the illustrated embodiment comprises a first BS 102-1, and a second BS 102-2. In the illustrated embodiments, a UE 104 (not shown) is in one of at least one serving cell covered by the first BS 102-1 and also in one of at least one serving cell covered by the second BS 102-2, i.e., the UE 104 is in connection with the first BS 102-1 and the second BS 102-2. In some embodiments, the first BS 102-1 is a primary wireless communication node and the second BS 102-2 is a secondary wireless communication node. In some other embodiments, the second BS 102-2 is a primary wireless communication node and the first BS 102-1 is a secondary wireless communication node. It should be noted that any numbers of BS 102 can be used and are within the scope of this invention.

The method 300 starts with operation 302 in which the first BS 102-1 transmits a first message to the second BS 102-2 according to some embodiments. In some embodiments, the first message comprises frequency information of all serving cells of the first BS 102-1. In some embodiments, the first message is transmitted from the first BS 102-1 to the second BS 102-2 through a UE-specific inter-node RRC (Radio Resource Control) message (e.g., CG-ConfigInfo). In some embodiments, the first message is transmitted during an addition or a modification process to the second BS 102-2. In some embodiments, the frequency information of all the serving cells of the first BS 102-1 comprises at least one of the following: frequency information of synchronization signal blocks (SSB) of the respective serving cells, and frequency information of channel state information reference signals (CSI-RS) of the respective serving cells. In some embodiments, the frequency information of the SSBs of the respective serving cells comprises at least one of the following of a SSB: a center frequency, a subcarrier spacing, and a band indicator. In some embodiments, the frequency information of CSI-RSs of the respective serving cells comprises at least one of the following of a CSI-RS: a start position in the frequency domain, a frequency offset, and a frequency bandwidth.

For example, the first BS 102-1 comprises a first serving cell with a first center frequency and a second serving cell with a second center frequency. The second BS 102-2 comprises a third serving cell with a third center frequency and a fourth serving cell with a fourth center frequency. During an addition or a modification process to the second BS 102-2, the first BS 102-1 transmits a first message to the second BS 102-2 so as to indicate frequency information (e.g., the first center frequency and the second center frequency) of the first serving cell and the second serving cell, respectively, to the second BS 102-2 through an inter-node RRC message (e.g., CG-ConfigInfo).

For another example, the first BS 102-1 comprises a first serving cell with a first SSB with a first center frequency. The first BS 102-1 also comprises a second serving cell with a CSI-RS with a first starting frequency and a first bandwidth. The second BS 102-2 comprises a second serving cell with a second SSB with a second center frequency. During an addition or a modification process to the second BS 102-2, the first BS 102-1 transmits a first message to the second BS 102-2 so as to indicate frequency information (e.g., the first center frequency, the first starting frequency, and the first bandwidth) of the first serving cell and the second serving cell, respectively, to the second BS 102-2 through an inter-node RRC message (e.g., CG-ConfigInfo).

In some embodiments, the first message can be received by the first BS 102-1 from the second BS 102-2. In some embodiments, the first message comprises frequency information of serving cells of the second BS 102-2. In some embodiments, the first message received from the second BS 102-2 by the first BS 102-1 is through an inter-node RRC message (e.g., CG-Config).

The method 300 continues with operation 304 in which the second BS 102-2 determines the type of frequency measurement according to some embodiments. In some embodiments, the second BS 102-2 determine the type of frequency measurement by comparing frequency information (e.g., a frequency set) of all serving cells and a measurement frequency. In some embodiments, when the measurement frequency on the UE is a subset of the frequency set of all the serving cells from both the first BS 102-1 and the second BS 102-2, the type of frequency measurement is an intra-frequency measurement. In some other embodiments, when the measurement frequency is not a subset of the frequency set of all the serving cells, the type of frequency measurement is an inter-frequency measurement.

For example, when the second BS 102-2 receives the frequency information (e.g., the first center frequency and the second center frequency) from the first BS 102-1, the frequency information of all the serving cells of the UE 104 is available to the second BS 102-2. When the second BS 102-2 configures a SSB-based frequency measurement on the first center frequency for the UE 104 which is a subset of the frequency set including the first center frequency, the second center frequency, the third center frequency and the fourth center frequency, the type of frequency measurement performed by the UE 104 is an intra-frequency measurement. When the second BS 102-2 configures a SSB-based frequency measurement on a fifth center frequency which is not a subset of the frequency set, the type of frequency measurement performed by the UE 104 is an inter-frequency measurement.

For another example, when the second BS 102-2 receives the CSI-RS frequency information (e.g., the first starting frequency, the first offset frequency and the first bandwidth) of the first serving cell and the SSB frequency information (e.g., the second center frequency and second subcarrier spacing) of the second serving cell of the first BS 102-1, the frequency information of all the serving cells of the UE 104 from both the first BS 102-1 and the second BS 102-2 is available to the second BS 102-2. When the second BS 102-2 configures a SSB-based frequency measurement on the third center frequency, the type of frequency measurement performed by the UE 104 is an inter-frequency measurement. When the second BS 102-2 configures a CSI-RS-based frequency measurement at the first starting frequency, first offset frequency with the first bandwidth, the type of frequency measurement performed by the UE 104 is an inter-frequency measurement.

In some embodiments, when the first message is received by the first BS 102-1, the first BS 102-1 can also determine the type of frequency measurement by comparing the frequency information of all the serving cells from both the first BS 102-1 and the second BS 102-2 and the measurement frequency configured by the first BS 102-1 for the UE 104.

The method 300 continues with operation 306 in which the first BS 102-1 transmits a second message to the second BS 102-2 according to some embodiments. In some embodiments, the second message is transmitted from the first BS 102-1 to the second BS 102-2 through a UE-specific inter-node RRC message. In some embodiments, the second message comprises a frequency measurement configuration. In some embodiments, the second message transmitted from the first BS 102-1 comprises at least one restriction of the frequency measurement configured by the second BS 102-2 for the UE 104. In some embodiments, the at least one restriction transmitted from the first BS 102-1 to the second BS 102-2 comprises one of the following: a first maximum number of allowed intra-frequency measurement identities and a first maximum number of allowed inter-frequency measurement identities that can be configured by the second BS 102-2 to the UE 104.

In some embodiments, the first maximum number of allowed intra-frequency measurement identities comprises an integer, which can be used for configuring each serving frequencies of the respective serving cells. In some embodiments, the first maximum number of allowed intra-frequency measurement identities comprises a plurality of integers for configuring a plurality of respective serving frequencies of respective serving cells. In some embodiments, the plurality of integers of the plurality of respective serving frequencies may be different. In some embodiments, the serving frequencies of the corresponding integers are also specified in the second message.

In some embodiments, when the first maximum number of allowed intra-frequency measurement identities of a respective frequency in the second message from the first BS 102-1 is "0", the second BS 102-2 is not allowed to configure the first maximum number of allowed intra-frequency measurement on the respective frequency for the UE 104. In some embodiments, when a first maximum number of allowed intra-frequency measurement identities of a respective frequency is not specified in the second message, the second BS 102-2 can configure a maximum number of intra-frequency measurement identities by itself which is not restricted by the first BS 102-1. In some embodiments, the first maximum number of allowed intra-frequency measurement identities configured by the second BS 102-2 is equal to or less than a predefined value. In some embodiments, the predefined value is preconfigured in the specification or configured by the system.

For example, the first BS 102-1 is a master gNB (MgNB), which has a first serving cell operating on a first frequency, and a second serving cell operating on a second frequency. The second BS 102-2 is a secondary gNB (SgNB), which has a third serving cell operating on a third frequency and a fourth serving cell operating on a fourth frequency. During a secondary node addition or modification procedure, the first BS 102-1 transmits a second message to the second BS 102-2 through an inter-node RRC message (e.g., CG-ConfigInfo). In one embodiments, the second message comprises a first maximum number (e.g., X=5) of allowed intra-frequency measurement identities for the serving frequencies including the first frequency, the second frequency, the third frequency and the fourth frequency. In some embodiments, the second message comprises a list of maximum numbers of allowed intra-frequency measurement identities X=[X1, X2, X3, X4]=[3, 2, 4, 5], which corresponds to the first frequency, the second frequency, the third frequency and the fourth frequency. Specifically, the maximum number of allowed intra-frequency measurement identities for the first frequency is 3; the maximum number of allowed intra-frequency measurement identities for the second frequency is 2; the maximum number of allowed intra-frequency measurement identities for the third frequency is 4; and the maximum number of allowed intra-frequency measurement identities for the fourth frequency is 5. In some embodiments, the first maximum numbers of allowed intra-frequency measurement identities (e.g., X=[X1, X2, X4]=[3, 0, 5]) and the corresponding frequencies (e.g., the first frequency, the second frequency and the fourth frequency) is transmitted in the second message. In some embodiments, the first maximum number of allowed intra-frequency measurement identities for the third frequency is not specified by the first BS 102-1 in the second message.

In some embodiments, the second message comprises a maximum number of allowed inter-frequency measurement identities. In some embodiments, the first maximum number of allowed inter-frequency measurement identities comprises an integer for all the inter-frequencies. In some embodiments, if the integer in the second message is "0", the second BS 102-2 is not allowed to configure the maximum number of allowed inter-frequency measurement for the UE 104. In some embodiments, when an integer in the second message is not specified for a serving frequency, the second BS 102-2 can configure a maximum number of allowed inter-frequency measurement identities for the serving frequency by itself without restrictions from the first BS 102-1. In some embodiments, the total maximum numbers of allowed inter-frequency measurement identities for at least one frequencies configured by the second BS 102-2 is equal to or less than a predefined value. In some embodiments, the predefined value is preconfigured in the specifications or configured by the system.

For example, the first BS 102-1 is a primary wireless communication node, which has a first serving cell operating on a first frequency, and a second serving cell operating on a second frequency. The second BS 102-2 is a secondary wireless communication node, which has a third serving cell operating on a third frequency and a fourth serving cell operating on a fourth frequency. During a secondary node addition or modification procedure, the first BS 102-1 transmits a second message to the second BS 102-2 through an inter-node RRC message (e.g., CG-ConfigInfo). The second message comprises a first maximum number (e.g., Y=6) of allowed inter-frequency measurement identities for frequency other than the first frequency, the second frequency, the third frequency and the fourth frequency. When the second BS 102-2 configures a number of inter-frequency measurement identities for a fifth frequency and a sixth frequency, which are not a subset of the serving frequencies of serving cells, the summation of the numbers of inter-frequency measurement identities for the fifth frequency and the sixth frequency is equal to or less than Y=6.

The method 300 continues with operation 308 in which the second BS 102-2 determines a first frequency measurement configuration according to some embodiments. In some embodiments, the type of a frequency measurement is determined after receiving the first message from the BS 102. In some embodiments, the configuration of the frequency measurement is determined by the second BS 102-2 according to the at least one restriction received in the second message from the first BS 102-1. In some embodiments, the configuration of the frequency measurement comprises one of the following: a number of intra-frequency measurement identities or a number of inter-frequency measurement identities according to some embodiments. In some embodiments, the number of intra-frequency measurement identities and the number of inter-frequency measurement identities each is equal to or less than the first maximum number of allowed intra-frequency measurement identities and the first maximum number of allowed inter-frequency measurement identities received in the second message, respectively.

For example, when a first maximum number (e.g., X=5) of allowed intra-frequency measurement identities is transmitted to the second BS 102-2 from the first BS 102-1, the second BS 102-2 further configures a number of frequency measurement identities for each serving frequency of the UE 104 according to the first maximum number in the first configuration of the frequency measurement. Specifically, a first number of intra-frequency measurement identities for the first frequency is equal to or smaller than X; a second number of intra-frequency measurement identities for the second frequency is equal to or smaller than X; a third number of intra-frequency measurement identities for the third frequency is equal to or smaller than X; and a fourth number of intra-frequency measurement identities for the fourth frequency is equal to or smaller than X.

For another example, when a first maximum number (X=[X1, X2, X3, X4]=[3, 2, 4, 5]) of allowed intra-frequency measurement identities for corresponding serving frequencies is transmitted to the second BS 102-2 from the first BS 102-1, the second BS 102-2 configures frequency measurements for the UE 104. Specifically, a first number of intra-frequency measurement identities for the first frequency is equal to or smaller than X1=3; a second number of intra-frequency measurement identities for the second frequency is equal to or smaller than X2=2; a third number of intra-frequency measurement identities for the third frequency is equal to or smaller than X3=4; and a fourth number of intra-frequency measurement identities for the fourth frequency is equal to or smaller than X4=5.

For another example, when a first maximum number (e.g., X=[X1, X2, X4]=[3, 0, 5]) of allowed intra-frequency measurement identities for the corresponding serving frequencies is transmitted to the second BS 102-2 from the first BS 102-1, the second BS 102-2 configures frequency measurement for the UE 104. Specifically, a first number of intra-frequency measurement identities for the first frequency is equal to or smaller than X1=3; and a fourth number of intra-frequency measurement identities for the fourth frequency is equal to or smaller than X4=5. Further, since X2=0, the second BS 102-2 is not allowed to configure a second number of intra-frequency measurement identities for the second frequency; and since X3 is not specified in the second message, the second BS 102-2 can configure a third number of intra-frequency measurement identities for the third frequency by itself without restrictions from the first BS 102-1, which is equal to or less than a predefined value. In some embodiments, the predefined value is preconfigured in the specifications or configured by the system.

For another example, when a first maximum number (e.g., Y=6) of allowed inter-frequency measurement identities is transmitted to the second BS 102-2 from the first BS 102-1, the second BS 102-2 configures frequency measurement for the UE 104. Specifically, a number of inter-frequency measurement identities for the each of all the inter-frequencies is equal to or smaller than Y.

The method 300 continues with operation 310 in which the first BS 102-1 receives a third message from the second BS 102-2 according to some embodiments. In some embodiments, the third message comprises a configuration restriction request. In some embodiments, the configuration restriction request comprises one of the following: a second maximum number of allowed intra-frequency measurement identities and a second maximum number of allowed inter-frequency measurement identities that can be configured by the second BS 102-2 for the UE 104. In some embodiments, the configuration restriction request in the second message also comprises information of respective frequencies. In some embodiments, the second maximum number is indicated explicitly in the third message. In some other embodiments, the third message comprises an extended number, wherein the extended number (a) is used to determine the second maximum number, e.g., the second maximum number equals a summation of the extended number (a) and the first maximum number, wherein a is a positive integer.

In some embodiments, the second maximum number of allowed intra-frequency measurement identities and the second maximum number of allowed inter-frequency measurement identities that can be configured by BS 102-2 are different from the first maximum number of allowed intra-frequency measurement identities and the first maximum number of allowed inter-frequency measurement identities that can be configured by BS 102-2 in the second message, respectively. In some embodiments, the second maximum number is different and greater than the first maximum number of allowed intra-frequency measurement identities and the first maximum number of allowed inter-frequency measurement identities, respectively, which is transmitted to the second BS 102-2 from the first BS 102-1 in the second message.

In some embodiments, the second maximum number of allowed intra-frequency measurement identities that can be configured by BS 102-2 comprises an integer for each of serving frequencies. In some embodiments, the second maximum number of allowed intra-frequency measurement identities that can be configured by BS 102-2 comprises a plurality of integers of a plurality of respective serving frequencies. In some embodiments, the plurality of integers of the plurality of respective serving frequencies may be different.

For example, when the second BS 102-2 is required to configure more numbers of intra-frequency measurements than the first maximum number X (e.g., X=3) of allowed intra-frequency measurement identities determined by the first BS 102-1, the second BS 102-2 prepares and transmits a configuration restriction request with a second maximum number X' (e.g., X'=5) of allowed intra-frequency measurement entities to the first BS 102-1 through an inter-node RRC message (e.g., CG-Config).

For another example, when the second message comprises a list of first maximum numbers of allowed intra-frequency measurement identities (e.g., X=[X1, X2, X3]=[3, 2, 5]) that can be configured by BS 102-2 and when the second BS 102-2 is required to configure more numbers of intra-frequency measurements, the second BS 102-2 can also prepare and transmit a configuration restriction request with an extended number (a=2) and the respective frequency (e.g., the second frequency) to the first BS 102-1. The extended number a is used to determine the second maximum number X' (e.g., Xi'=Xi+a, wherein i is the i-th frequency) of allowed intra-frequency measurement entities to the first BS 102-1. The extended number a can be transmitted from the second BS 102-2 to the first BS 102-1 through an inter-node RRC message (e.g., CG-Config).

For another example, when the second BS 102-2 is required to configure more numbers of inter-frequency measurements than the first maximum number of allowed inter-frequency identities (e.g., Y=3) that can be configured by BS 102-2, the second BS 102-2 prepares and transmits a configuration restriction request with a second maximum number Y' (e.g., Y'=5) of allowed inter-frequency measurement entities to the first BS 102-1 through an inter-node RRC message (e.g., CG-Config).

The method 300 continues with operation 312 in which the first BS 102-1 evaluates the configuration restriction request received from the second BS 102-2 and determine a second configuration of the frequency measurement according to some embodiments. In some embodiments, the second configuration of the frequency measurement comprises a third maximum number of one of the following: allowed intra-frequency measurement identities and allowed inter-frequency measurement identities that can be configured by BS 102-2. In some embodiments, the third maximum number of allowed inter-frequency measurement identities and the third maximum number of allowed intra-frequency measurement identities that can be configured by BS 102-2 are determined according to available numbers of inter-frequency measurement identities and intra-frequency measurement identities. In some embodiments, the third maximum number can be the same as or different from the second maximum number received in the third message.

The method 300 continues with operation 310 in which the first BS 102-1 transmits a fourth message to the second BS 102-2 according to some embodiments. In some embodiments, the third message comprises one of the following: the third maximum number of allowed intra-frequency measurement identities and the third maximum number of allowed inter-frequency measurement identities determined by the first BS 102-1. In some embodiments, the third maximum number can be the same as or different from the second maximum number received in the third message.

For example, the third maximum number of allowed intra-frequency measurement identities that can be configured by BS 102-2 equals the second maximum number (e.g., X'=5) of allowed intra-frequency measurement identities requested by the second BS 102-2 in the third message. The third maximum number, which is equal to the second maximum number (X') of allowed intra-frequency measurement identities, is then transmitted by the first BS 102-1 to the second BS 102-2. The third maximum number of allowed intra-frequency measurement identities is then used for all the serving frequencies. The third maximum number of allowed intra-frequency measurement identities that can be configured by BS 102-2 can be less than the second maximum number (e.g., X'=5) of allowed intra-frequency measurement identities requested by the second BS 102-2. For example, the third maximum number, which is equal to the first maximum number of allowed intra-frequency measurement identities (X=3) is then transmitted again by the first BS 102-1 to the second BS 102-2 through an inter-node RRC message (e.g., CG-ConfigInfo). The first maximum number of allowed intra-frequency measurement identities is then used for all the serving frequencies.

For another example, when an extended number (a=2) for the second frequency is received in the third message from the second BS 102-2, the third maximum number of allowed intra-frequency measurement identities, which is equal to a summation of the first maximum number (X2=2) of allowed intra-frequency measurement identities of the respective frequency (e.g., second frequency) and the extended number (a), is then transmitted by the first BS 102-1 to the second BS 102-2 in the fourth message. The third maximum number of allowed intra-frequency measurement identities (e.g., X2+a=4) that can be configured by BS 102-2 is used for the second frequency. For another example, the third maximum number of allowed intra-frequency measurement identities that can be configured by BS 102-2, which can be equal to the first maximum number of allowed intra-frequency measurement identities (X2=2) of the second frequency is then transmitted again by the first BS 102-1 back to the second BS 102-2. The first maximum number of allowed intra-frequency measurement identities of X2=2 is then used for the second frequency. For another example, the third maximum number of allowed intra-frequency measurement identities that can be configured by BS 102-2 can be also smaller than the first maximum number of allowed intra-frequency measurement identities, which can be transmitted back to the second BS 102-2 and used for the second frequency.

For another example, the third maximum number of allowed inter-frequency measurement identities that can be configured by BS 102-2, can be equal to the second maximum number of allowed inter-frequency measurement identities Y', which is then transmitted by the first BS 102-1 to the second BS 102-2. The third maximum number of allowed inter-frequency measurement identities that can be configured by BS 102-2 is then used for all the serving frequencies. On the other hand, the third maximum number of allowed inter-frequency measurement identities can be equal to or smaller than the first maximum number of allowed inter-frequency measurement identities (Y=3) is then transmitted again by the first BS 102-1 back to the second BS 102-2. The third maximum number of allowed inter-frequency measurement identities that can be configured by BS 102-2 is then used for all the serving frequencies.

For another example, when an extended number (a=2) is received in the third message from the second BS 102-2, the third maximum number of allowed inter-frequency measurement identities that can be configured by BS 102-2, which is equal to a summation of the first maximum number (Y=3) of allowed inter-frequency measurement identities and the extended number (a), is then transmitted by the first BS 102-1 to the second BS 102-2. The third maximum number of allowed inter-frequency measurement identities of the respective frequency (e.g., Y+a=5) is used for all the serving frequencies. On the other hand, the third maximum number of allowed inter-frequency measurement identities that can be configured by BS 102-2, which can be equal to or smaller than the first maximum number of allowed inter-frequency measurement identities (Y=3) is then transmitted again by the first BS 102-1 back to the second BS 102-2. The first maximum number of allowed inter-frequency measurement identities that can be configured by BS 102-2 is then used for all the serving frequencies.

Figure 4:
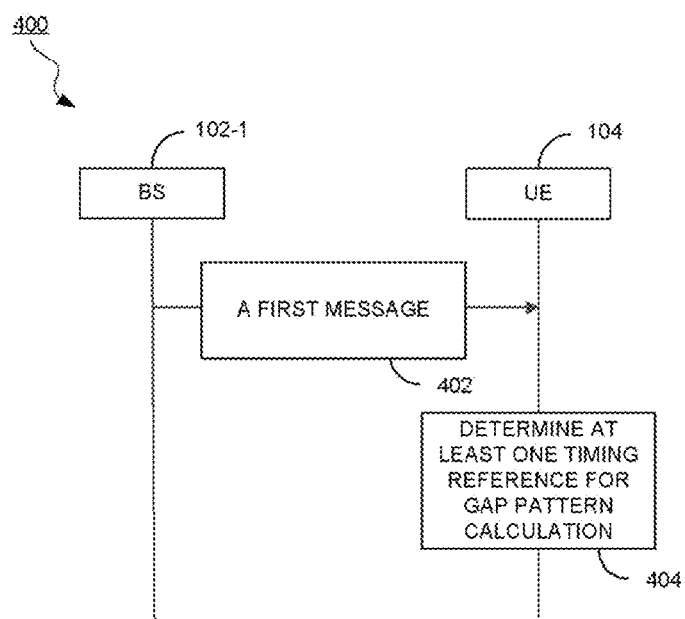
FIG. 4 illustrates a method for determining at least one reference timing for gap calculation, in accordance with some embodiments of the present disclosure.

FIG. 4 illustrates a method 400 for determining at least one reference timing for gap calculation, in accordance with some embodiments of the present disclosure. It is understood that additional operations may be provided before, during, and after the method 400 of FIG. 4, and that some operations may be omitted or reordered. The communication system in the illustrated embodiment comprises a first BS 102-1. In the illustrated embodiments, a UE 104 is in one of at least one serving cell covered by the first BS 102-1 and also in one of at least one serving cell covered by the second BS 102-2 (not shown), i.e., the UE 104 is in connection with the first BS 102-1 and the second BS 102-2. In some embodiments, the first BS 102-1 is a primary wireless communication node. It should be noted that any numbers of BS 102 can be used and are within the scope of this invention.

The method 400 starts with operation 402 in which the first BS 102-1 transmits a first message to the UE 104 according to some embodiments. In some embodiments, the first message comprises information of a timing reference. In some embodiments, the timing reference is also transmitted from the first BS 102-1 to the second BS 102-2. In some embodiments, the timing reference is an explicit indicator to indicate whether a serving cell of the first BS 102-1 or the second BS 102-2 is used for gap calculation. In some embodiments, the timing reference is an indicator with a value of TRUE when a serving cell on a specific frequency is in a MCG or a value of FALSE when a serving cell on a specific frequency is in a SCG. In some other embodiments, the timing reference is an indication comprising an index of one of the following: a primary cell of the first BS 102-1 (PCell), a primary cell of the second BS 102-2 (PSCell), and a serving cell. In some embodiments, the information of the timing reference is indicated with respect to at least one of the following gap patterns: a Per-UE gap pattern, a Per-FR FR1 gap pattern, and a Per-FR FR2 gap pattern. In some embodiments, when the first message is transmitted from the first BS 102-1 to the UE 104, the first message is an RRCReconfiguration message. In some embodiments, when the timing reference is transmitted from the first BS 102-1 to the second BS 102-2, the timing reference is carried in an inter-node RRC message.

The method 400 continues with operation 404 in which the UE 104 determines the gap position according to some embodiments. In some embodiments, when an index of a serving cell is received, the UE 104 can determine a synchronization timing of the serving cell according to the index. After the synchronization timing is obtained according to the index of the serving cell, the position of the gap in the time domain can be determined according to the synchronization timing and the gap pattern.

For example, the first BS 102-1 and the second BS 102-2 comprises serving cells operating on a FR2 frequency. When the UE 104 is configured to perform frequency measurement on the FR2 frequency, the first BS 102-1 configures a gap pattern of the FR2 frequency and determines whether to use a respective system frame number (SFN) and a subframe of a serving cell on the FR2 frequency of the first BS 102-1 or the second BS 102-2 for calculating a position of the FR2 gap. The first BS 102-1 transmits an RRCReconfiguration message to the UE 104, wherein the RRCReconfiguration message comprises the pattern of the FR2 gap and an indicator of the timing reference (e.g., use SCG-FR2serving). When the indicator is set to "TRUE", the SFN and the subframe of one of the serving cells on the FR2 frequency of the second BS 102-2 is used to determine the position of the FR2 gap. When the indicator is set to "FAULSE", the SFN and the subframe of one of the serving cells on the FR2 frequency of the first BS 102-1 are used to determine the position of the FR2 gap. The first BS 102-1 also transmits the gap pattern of the FR2 frequency and the indicator of the timing reference to the second BS 102-2 through an inter-node RRC message (e.g., CG-ConfigInfo).

For another example, the first BS 102-1 and the second BS 102-2 comprises serving cells operating on a FR2 frequency. When the UE 104 is configured to perform frequency measurement on the FR2 frequency, the first BS 102-1 configures a gap pattern of the FR2 frequency and determines whether to use a respective SFN and a subframe of a PCell on the FR2 frequency of the first BS 102-1 or a PSCell of the second BS 102-2 for calculating a position of the FR2 gap in the time domain. The first BS 102-1 transmits an RRCReconfiguration message to the UE 104, wherein the RRCReconfiguration message comprises the gap pattern of the FR2 frequency and an indicator of the timing reference. When the indicator is set to "PSCell", the SFN and the subframe of the PSCell are used to determine the gap position of the FR2 frequency. The first BS 102-1 also transmits the gap pattern of the FR2 frequency and the indicator of the timing reference to the second BS 102-2 through an inter-node RRC message (e.g., CG-ConfigInfo).

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for configuring a gap, comprising:
    transmitting, by a first base station, a first message to a user equipment to configure the gap, the first message comprising first time reference information and the first time reference information indicating a cell including, a primary cell of the first base station, a primary cell of a second base station, or a serving cell; and
    configuring, by using the first message, the user equipment to use a system frame number and a subframe of the cell for gap calculation.

2. The method of claim 1, wherein the first message is an RRCReconfiguration message.

3. The method of claim 1, wherein the first time reference information is indicated with respect to at least one of the following gap patterns: a Per-UE gap pattern, a Per-FR FR1 gap pattern, or a Per-FR FR2 gap pattern.

4. The method of claim 1, further comprising:
    transmitting, by the first base station, a second message to the second base station, the second message comprising second time reference information and the second time reference information indicating the primary cell of the first base station, the primary cell of the second base station, or the serving cell.

5. The method of claim 4, wherein the second message is carried in an inter-node RRC message.

6. The method of claim 4, wherein the second time reference information is indicated with respect to at least one of the following gap patterns: a Per-UE gap pattern, a Per-FR FR1 gap pattern, or a Per-FR FR2 gap pattern.

7. A wireless communication node, comprising:
- a transceiver, configured to transmit a first message to a user equipment to configure a gap, the first message comprising first time reference information and the first time reference information indicating a cell including a primary cell of a first base station, a primary cell of a second base station, or a serving cell,
- wherein the first message is adapted to configure the user equipment to use a system frame number and a subframe of the cell for gap calculation.

8. The wireless communication node of claim 7, wherein the first message is an RRCReconfiguration message.

9. The wireless communication node of claim 7, wherein the first time reference information is indicated with respect to at least one of the following gap patterns: a Per-UE gap pattern, a Per-FR FR1 gap pattern, or a Per-FR FR2 gap pattern.

10. The wireless communication node of claim 7, wherein the transceiver is further configured to transmit a second message to the second base station, the second message comprising second time reference information and the second time reference information indicating the primary cell of the first base station, the primary cell of the second base station, or the serving cell.

11. The wireless communication node of claim 10, wherein the second message is an RRCReconfiguration message.

12. The wireless communication node of claim 10, wherein the second time reference information is indicated with respect to at least one of the following gap patterns: a Per-UE gap pattern, a Per-FR FR1 gap pattern, or a Per-FR FR2 gap pattern.

13. A method for configuring a gap, comprising:
- receiving, by a user equipment, a first message from a first base station, the first message comprising time reference information and the time reference information indicating a cell including a primary cell of the first base station, a primary cell of a second base station, or a serving cell; and
- determining to use a system frame number and a subframe of the cell for gap calculation according to the time reference information.

14. The method of claim 13, wherein the time reference information is indicated with respect to at least one of the following gap patterns: a Per-UE gap pattern, a Per-FR FR1 gap pattern, or a Per-FR FR2 gap pattern.

15. The method of claim 13, wherein the first message is an RRCReconfiguration message.

16. A wireless communication device, comprising:
- a transceiver, configured to receive a first message from a first base station, the first message comprising time reference information and the time reference information indicating a cell including a primary cell of the first base station, a primary cell of a second base station, or a serving cell; and
- a processor, electrically coupled to the transceiver and configured to determine to use a system frame number and a subframe of the cell for gap calculation according to the time reference information.

17. The wireless communication device of claim 16, wherein the time reference information is indicated with respect to at least one of the following gap patterns: a Per-UE gap pattern, a Per-FR FR1 gap pattern, or a Per-FR FR2 gap pattern.

18. The wireless communication device of claim 16, wherein the first message is an RRCReconfiguration message.

* * * * *